United States Patent [19]

Nakajima

[11] 4,291,262
[45] Sep. 22, 1981

[54] SERVO POSITIONING APPARATUS

[75] Inventor: Yoshinori Nakajima, Tokyo, Japan

[73] Assignee: Ricoh Company, Ltd., Tokyo, Japan

[21] Appl. No.: 88,805

[22] Filed: Oct. 29, 1979

[30] Foreign Application Priority Data

Nov. 14, 1978 [JP] Japan ................................ 53-140145

[51] Int. Cl.³ ............................................. G05B 19/28
[52] U.S. Cl. .................................. 318/603; 318/571; 318/664
[58] Field of Search ............... 318/600, 603, 601, 602, 318/664, 571

[56] References Cited

U.S. PATENT DOCUMENTS

| 3,826,964 | 7/1974 | Byrne | 318/664 X |
| 4,033,525 | 7/1977 | Leonard | 318/603 X |
| 4,101,817 | 7/1978 | Maeda | 318/603 |
| 4,131,840 | 12/1978 | Wiesner | 318/664 X |

Primary Examiner—B. Dobeck
Attorney, Agent, or Firm—David G. Alexander

[57] ABSTRACT

While a motor shaft (13) is moving from a previous position to a present command position, the number of steps between the present command position and a new command position is calculated. After the shaft (13) reaches the present command position, the shaft (13) is driven to the new command position in accordance with the calculated number of steps.

8 Claims, 5 Drawing Figures

SERVO POSITIONING APPARATUS

BACKGROUND OF THE INVENTION

The present invention relates to a servo positioning apparatus which is especially suited for positioning rotary printing element in an impact printer.

Impact printers comprising rotary type elements are well known in the art. Especially advantageous are the so-called daisy wheel printers comprising type elements having type members provided at the ends of spokes extending from a central hub. The type members bear characters, numerals, symbols and the like which are to be printed, with each character or the like corresponding to a discrete rotational position of a motor shaft on which the type element is mounted.

In order to print a character, a computing means computes the number of motor shaft steps or increments from a present position to the position corresponding to the character to be printed, and the motor is energized with an amount of power corresponding to the position difference. The amount of power is progressively reduced to zero as the shaft reaches the desired position. The shaft and type element are stopped at the desired position and a hammer is driven to impact the type member against a sheet of paper through a ribbon for printing.

Thereafter, the number of steps from the present position to the position of the next character to be printed is computed and the motor energized in accordance with the new difference.

An apparatus of this type as thus far developed is limited in speed of operation by the fact that the computing means must compute the distance to the next printing position after the motor shaft and type element reached the desired position for printing the present character. The computing operation takes a significant amount of time, and the motor shaft cannot be driven until the computation is completed.

SUMMARY OF THE INVENTION

A servo positioning apparatus embodying the present invention includes a motor having a shaft and drive means for applying drive power to the motor, and is characterized by comprising position difference storage means for storing a present position difference between a previous command shaft position and a present command shaft position, the drive means applying drive power to the motor in accordance with the present position difference, computing means for computing a new position difference between a new command shaft position and the present command position while the shaft is moving from the previous position to the present command position, and control means for controlling the position difference storage means to store the new position difference when the shaft reaches the present command position.

While a motor shaft is moving from a previous position to a present command position, the number of steps between the present command position and a new command position is calculated. After the shaft reaches the present command position, the shaft is driven to the new command position in accordance with the calculated number of steps.

It is an object of the present invention to provide a servo positioning apparatus which operates at substantially increased speed compared to the prior art.

It is another object of the present invention to provide a servo positioning apparatus constructed to perform operations simultaneously which are performed sequentially in the prior art, thus improving efficiency and speed.

It is another object of the present invention to provide a servo positioning apparatus which can be produced economically and effectively on a commercial production basis.

It is another object of the present invention to provide a generally improved servo positioning apparatus.

Other objects, together with the foregoing, are attained in the embodiments described in the following description and illustrated in the accompanying drawing.

DESCRIPTION OF THE PREFERRED EMBODIMENT

While the servo positioning apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
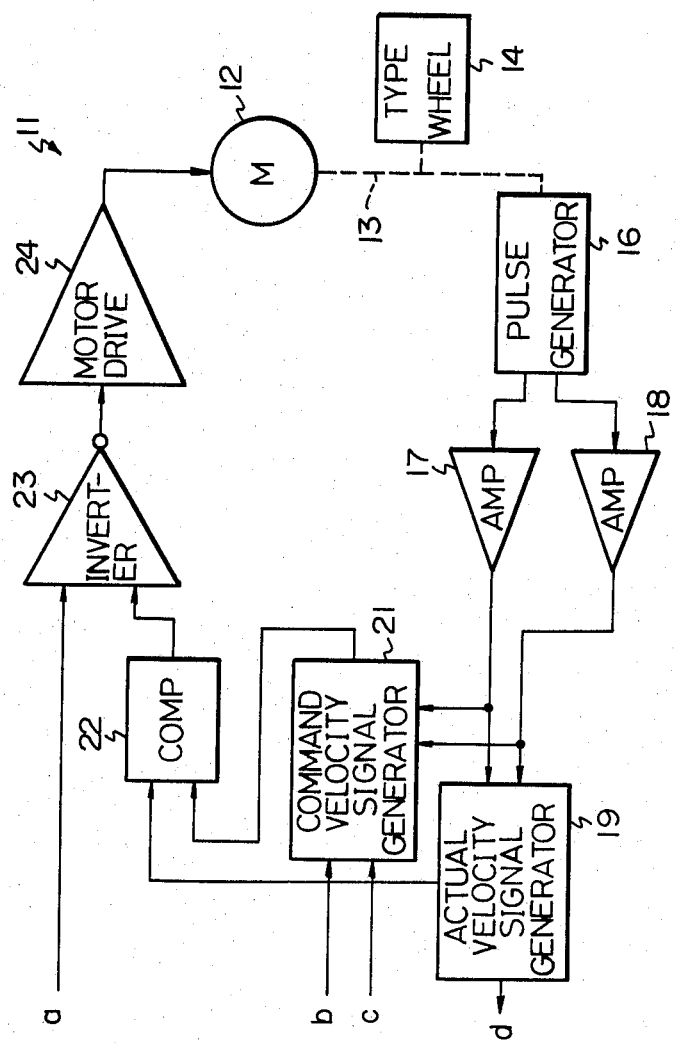
FIG. 1 is a block diagram of a servo positioning apparatus of the present type.

Referring now to FIG. 1 of the drawing, a servo positioning apparatus is generally designated by the reference numeral 11 and comprises a motor 12 having a shaft 13. A rotary type element or wheel 14 is fixed to the shaft 13 for unitary rotation. The type wheel 14, although not shown in detail, has a number of type members corresponding to characters, numbers, symbols and the like in a circumferentially spaced arrangement. The type wheel 14 is movable between a number of rotational steps, increments or positions corresponding to the number of circumferentially spaced type members. The motor 12 is designed to rotate the shaft 13 and wheel 14 so that the type member bearing the desired character or the like which is to be printed is moved to a printing position. Thereafter, a print hammer is driven to impact the selected type member against a sheet or paper through a ribbon for printing, although not illustrated.

A pulse generator 16 is associated with the shaft 13 in such a manner as to produce pulses corresponding to rotation of the shaft 13. Typically, two pulses will be produced for each step or increment of shaft rotation, although the invention is not so limited. The two pulses will be 90° spaced from each other in phase relation. The pulse generator 16 may comprise a disc formed with a plurality of circumferentially spaced slots fixed to the shaft 13 and a light source and photosensor disposed on opposite sides of the disc. Another alternative is to use an electromagnetic generator such as an inductosyn unit (INDUCTOSYN:Trademark) which produces the required signals. The details of the pulse generator 16 are not the subject matter of the present invention and are not shown.

The pulses from the generator 16 are fed through amplifiers 17 and 18 to an actual velocity signal generator 19. Typically, the two pulse signals and their inversions are commutated or rectified to produce an actual velocity signal having a magnitude proportional to the velocity of rotation of the shaft 13. The generator 19 also produces position pulses corresponding to the zero crossings of one of the signals from the amplifiers 17 and 18. One position pulse, designated as d, will be produced for each step of rotation of the shaft 13. The signals from the amplifiers 17 and 18 are also fed to a command velocity signal generator 21 which generates a reference signal in response thereto. The reference signal varies in accordance with variations in the output of the pulse generator 16 or the like caused by temperature changes and other random factors. The reference signal cancels out corresponding variations appearing in the actual velocity signal from the generator 19.

Fed to the generator 21 is a difference level signal b indicating the distance from the present motor shaft position to the desired position. The generator 21 voltage divides the reference signal in accordance with the magnitude of the difference level signal b to produce a command velocity signal which indicates the computed optimum velocity the shaft 13 should be rotating in order to reach the desired step or position in minimum time without overshoot. The level signal b and command velocity signal are progressively reduced to zero as the shaft 13 approaches the desired position.

The actual velocity signal from the generator 19 and the command velocity signal from the generator 21 are applied to a comparator 22 which produces an output corresponding to the difference therebetween. This signal is a velocity error signal and indicates both the magnitude and direction of the velocity error. The error signal is applied to an inverter 23 which also receives a direction signal a indicating the desired direction of rotation of the shaft 13. The output of the inverter 23 is fed to a motor drive unit 24 which energizes the motor 12 to rotate the shaft 13 in the proper direction and at the proper speed.

For example, if the actual velocity is equal to the command velocity, the error signal output of the comparator 22 will be zero and the motor 12 will not be energized. If the actual velocity signal is higher than the command velocity signal, the comparator 22 will produce an error signal having a polarity or sign such as to energize the motor 12 for shaft rotation in the direction opposite to the present direction of rotation. This will have a braking effect on the shaft 13. Conversely, if the actual velocity signal is lower than the command velocity signal, the motor 12 will be energized for shaft rotation in the same direction as the present rotation to increase the angular velocity of the shaft 13.

When the shaft 13 reaches the command position, the generator 21 receives a stop signal c which causes the apparatus 11 to operate in a detent mode in which the velocity command signal is applied directly to the motor 12. This operation will not be described in detail because it is not the particular subject matter of the present invention. It suffices to understand that in the detent mode the shaft 13 is locked in the desired position.

Figure 2:
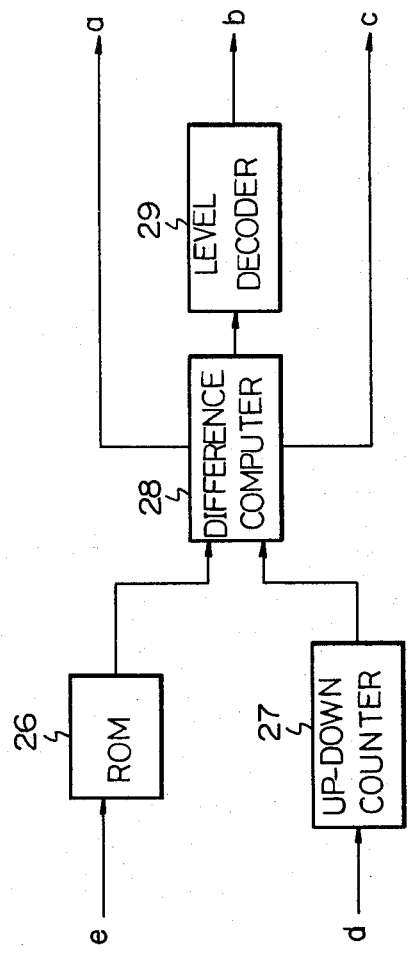
FIG. 2 is a block diagram of a prior art means for computing a command velocity signal.

FIG. 2 illustrates a prior art means for generating the signals a, b and c. A code such as in the ASCII format indicating the desired character to be printed is designated as e and applied to a read-only memory (ROM) 26 as an address input. The ROM 26 produces at its output a signal indicating the position of the shaft 13 in which the desired type member is in the printing position.

The position pulses d are applied to an up-down counter 27 in such a manner that the count in the counter 27 corresponds to the present position or step of the shaft 13. For example, the counter 27 will be incremented in response to clockwise rotation and decremented in response to counterclockwise rotation. Further illustrated is a difference computer 28 which computes the difference between the command position from the ROM 26 and the actual position from the counter 27. The difference is the number of steps between the desired or command position and the present position.

The computer 28 is constructed to compute not only the position difference but also whether the position difference is smaller in the counterclockwise or clockwise direction. The computer 28 produces the difference output corresponding to the shortest difference and also the signal a indicating the corresponding direction of rotation. The difference signal is applied to a level decoder 29 which produces the signal b in accordance with the magnitude of the position difference signal from the computer 28. When the difference signal has a large magnitude, the magnitude of the signal b will also be large. The signal b is variable in a plurality of discrete levels.

The difference between the outputs of the ROM 26 and counter 27 will have a positive or negative value and a magnitude which is equal to, less than or more than a value corresponding to 180° of rotation of the shaft 13. Where the magnitude of the difference is greater than the 180° rotation value, the sign of the difference is changed and the difference is subtracted from a value corresponding to 360° of rotation. This produces a converted difference value which is applied to the decoder 29 and corresponds to the compliment of the originally computed difference. In this manner, the computer 28 computes the difference between the command position and present position in the direction providing the shortest rotational distance between the positions. The direction signal a indicates the direction of rotation in the direction providing the shortest distance.

The arrangement illustrated in FIG. 2 is slow in operation since the difference computer 28 must compute the difference between the command position and present position after each step of rotation of the shaft 13. The computation takes a significant amount of time and adds to the time required for actually rotating the shaft 13.

Figure 3:
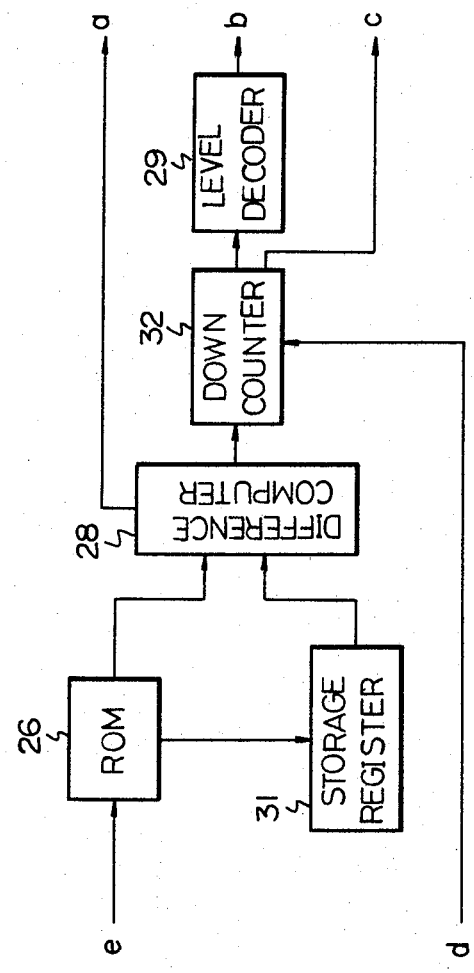
FIG. 3 is a block diagram of means in accordance with the present invention for computing a command velocity signal in an improved and faster manner.

These drawbacks are overcome in accordance with the present invention as illustrated in FIG. 3. Like elements are designated by the same reference numerals used in FIG. 2.

A previous command position is the position of the shaft 13 at which printing of the previous character was performed. A present command position is the position to which the shaft 13 is to be moved from the previous command position to print the next character. A present position is the instantaneous position of the shaft 13 between the previous command position and the present command position. A new command position is a position to which the shaft 13 is to be moved from the present command position to print a next character.

At the start of operation of the apparatus 11, an initial value corresponding to an initial position of the shaft 13 is stored in a storage register 31 which has an output connected to the computer 28. This initial position constitutes the previous command position. The ROM 26 produces at its output the present command position. The computer 28 computes a present difference between the previous command position and the present command position and sets this difference into a down counter 32. The down counter 32 is decremented by the position pulses d to the count of zero at which the shaft 13 is in the present command position.

As soon as the present difference has been set into the counter 32, movement of the shaft 13 toward the present command position begins. Also, the present command position is stored in the register 31 from the ROM 26 and the code for a new character is applied to the ROM 26 which produces a new command position in response thereto. Thus, while the shaft 13 is moving from the previous command position to the present command position, the output of the ROM 26 is the new command position and the output of the register 31 is the present command position. The present command position was set into the counter 32 but is being progressively decrement.

While the shaft 13 is moving toward the present command position, the computer 28 computes a new position difference between the present command position and the new command position. When the shaft 13 reaches the present command position, the new position difference will be set into the counter 32 from the computer 28 and the new command position will be set into the register 31 from the ROM 26. The shaft 13 will then move toward the new command position and another character code will be applied to the ROM 26.

In summary, while the shaft 13 is moving from the previous command position to the present command position, the computer 28 computes the difference between the present command position and the new command position. This process is repeated for printing a desired number of character. The down counter 32 produces the stop signal c when the count has been decremented to zero.

The new command position becomes the present command position when it is stored in the register 31 from the ROM 26. In a similar manner, the new position difference becomes the present position difference when it is set into the counter 32 from the computer 28.

Figure 4:
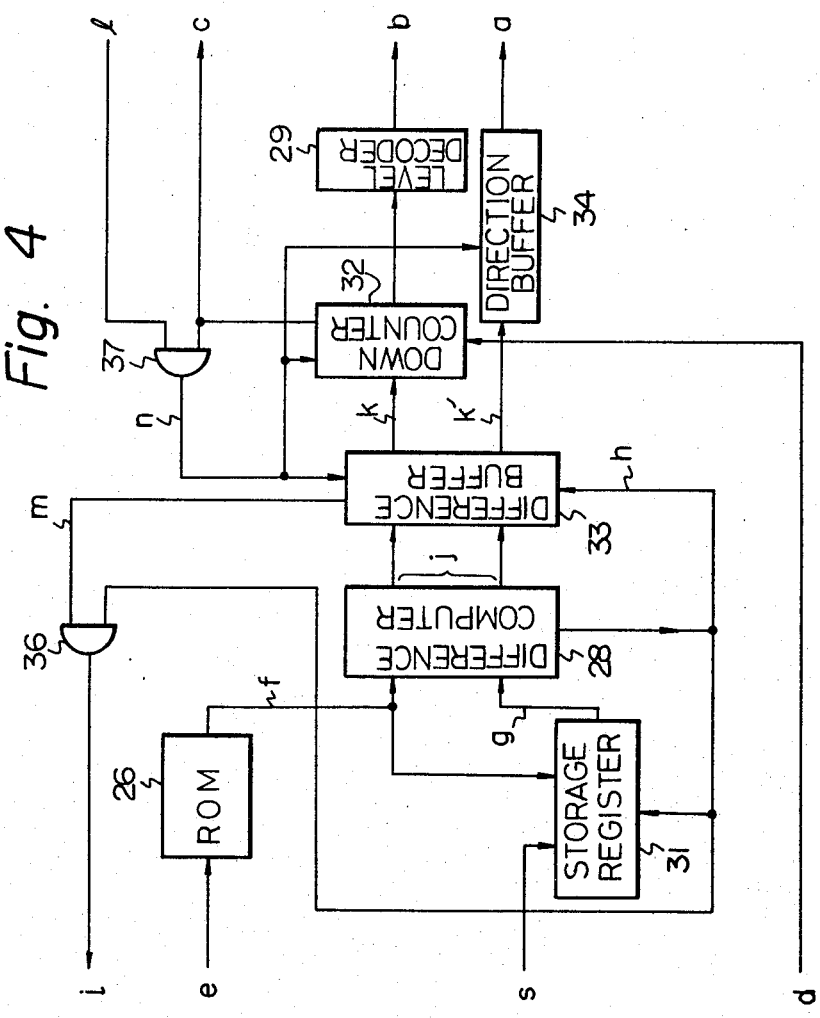
FIG. 4 is a more detailed block diagram of the present invention.
Figure 5:
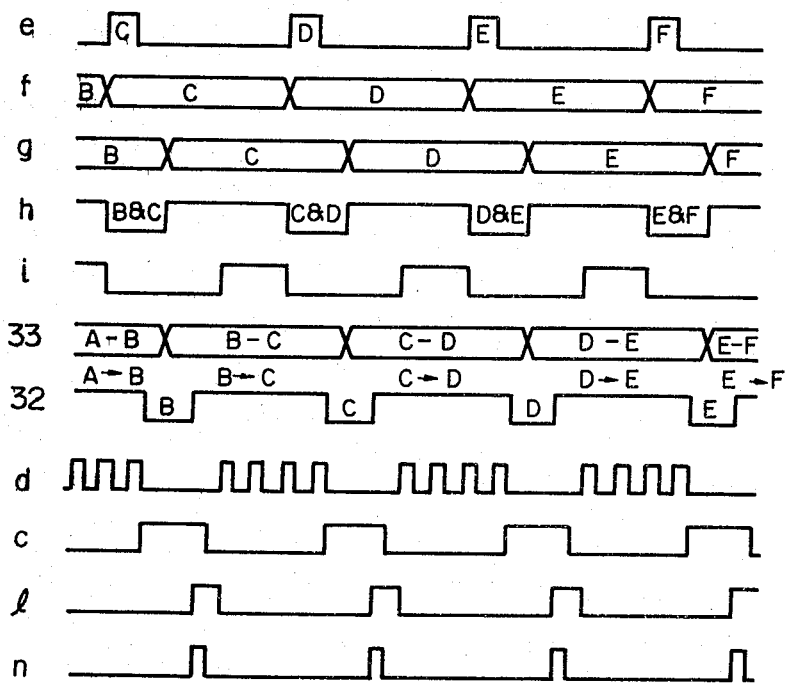
FIG. 5 is a timing diagram corresponding to FIG. 4.

The present apparatus 11 is illustrated in greater detail in FIG. 4. The operation is shown in FIG. 5 where it is assumed that the characters A, B, C, D . . . are to be printed in sequence.

The output of the difference computer 28 is connected to a difference buffer register 33. The direction signal a is stored in a direction buffer 34. Further illustrated are AND gates 36 and 37 which will be described in detail below.

In response to a first code signal e to the ROM 26, the difference computer 28 begins computing the difference between the positions in the ROM 26 and register 31. The new command position in the ROM 26 is designated as f whereas the present command position in the register 31 is designated as g. The initial value which is the first present command position is designated as s.

When the computation is completed, the computer 28 produces a computation end signal h which is fed to the register 31, AND gate 36 and buffer 33. The signal h causes the new position difference, designated as j, to be set into the buffer 33. The signal h also causes the new command position f to be set into the register 31 to constitute the present command position.

The stop signal c and a rotation end signal 1 are applied to inputs of the AND gate 37. When both signals c and 1 are present in coincidence, the AND gate 37 produces a high signal n which is applied to the buffer 33, counter 32 and buffer 34. The signal n causes the new position difference, designated as k, to be set into the counter 32 and causes the new direction signal, designated as k', to be set into the buffer 34. The signal n also causes the buffer 33 to be cleared.

When cleared, the buffer 33 produces a clear signal m which is applied to the AND gate 36. Since the computation in the computer 28 has been completed, the signal h will also be high. Thus, the AND gate 36 produces a high output signal designated as i, which constitutes a new code request signal. In response to the signal i, a new code e will be applied to the ROM 26 from a computer, keyboard or the like and the process of printing the character corresponding to the new code signal e will be performed in the manner described above.

In summary, it will be seen that the present invention overcomes the drawbacks of the prior art and provides a servo positioning apparatus for the type wheel of a printer or the like which operates at substantially increased speed and efficiency compared to the prior art. Various modification will become possible for those skilled in the art after receiving the teachings of the present disclosure without departing from the scope thereof. For example, the apparatus may be modified to compute and store the position differences for several characters which are to be printed after printing a present character, rather than storing the position difference for only one future character.

What is claimed is:

1. A servo positioning apparatus including a motor having a shaft and drive means for applying drive power to the motor, characterized by comprising:
   position difference storage means for storing a present position difference between a previous command shaft position and a present command shaft position, the drive means applying drive power to the motor in accordance with the present position difference;
   computing means for computing a new position difference between a new command shaft position and the present command position while the shaft is moving from the previous command position to the present command position; and
   control means for controlling the position difference storage means to store the new position difference when the shaft reaches the present command position.

2. An apparatus as in claim 1, in which the position difference storage means comprises a down counter, the drive means comprising position pulse generator means for generating position pulses corresponding to rotational increments of the shaft, the position pulses decrementing the counter.

3. An apparatus as in claim 1, in which the computing means is constructed to compute a direction of shaft rotation in which the new position difference is minimum.

4. An apparatus as in claim 1, further comprising present command position storage means for storing the present command position for application to the computing means, the control means causing the present command position storage means to store the new command position when the shaft reaches the present command position.

5. An apparatus as in claim 1, further comprising a rotary type element fixed to the shaft, the apparatus further comprising code converter means for converting a type element code into the new command position which corresponds thereto.

6. An apparatus as in claim 5, in which the code converter means comprises a read-only memory.

7. An apparatus as in claim 4, in which the present command position storage means comprises a register.

8. An apparatus as in claim 2, in which the present position difference and the new position difference are constituted by respective numbers of rotational increments.

* * * * *